United States Patent [19]

Muir

[11] 4,346,461

[45] Aug. 24, 1982

[54] SEISMIC EXPLORATION USING VIBRATORY SOURCES, SIGN-BIT RECORDING, AND PROCESSING THAT MAXIMIZES THE OBTAINED SUBSURFACE INFORMATION

[75] Inventor: Francis Muir, Laguna Niguel, Calif.

[73] Assignee: Chevron Research Company, San Francisco, Calif.

[21] Appl. No.: 117,689

[22] Filed: Feb. 1, 1980

[51] Int. Cl.³ .......................... G01V 1/20; G01V 1/36
[52] U.S. Cl. ..................................... 367/39; 367/100; 364/421
[58] Field of Search ........................ 367/39, 41, 55, 60, 367/100, 905; 343/100 CL; 364/421, 717, 728

[56] References Cited

U.S. PATENT DOCUMENTS

| | | | |
|---|---|---|---|
| 3,697,938 | 10/1972 | Taner | 367/39 |
| 3,863,058 | 1/1975 | Savit | 367/41 |
| 4,023,026 | 5/1977 | O'Farrell | 364/717 |
| 4,044,356 | 8/1977 | Fournier | 367/39 |
| 4,049,077 | 9/1977 | Mifsud | 367/39 |
| 4,054,862 | 10/1977 | Bachman | 367/100 |
| 4,064,481 | 12/1977 | Silverman | 367/40 |
| 4,086,560 | 4/1978 | Johnston et al. | 367/100 |
| 4,156,876 | 5/1979 | Debuisser | 364/728 |
| 4,189,704 | 2/1980 | Martin et al. | 367/60 |
| 4,234,053 | 11/1980 | Erich | 367/55 |

FOREIGN PATENT DOCUMENTS 720392 3/1980 U.S.S.R. ................................ 367/39

OTHER PUBLICATIONS

Bernhardt et al., "Encoding Techniques for the Vibroseis System", 3/78, Geophy. Prosp., vol. 26, #1.
Barbier, "Sosia, A New Seismic Method", 11/12/70, pp. 1-23, Meeting of Society of Explor. Geophys.
Bacher et al., "Linear Modelling . . . Input Signals", 1968, pp. 393-416, Automatica, vol. 4.
Achroyd et al., "Optimum Mismatched . . . Suppression", 3/73, IEEE Trans. on Aerospace & Elect. Syst., vol. 9, #2, pp. 214-218.
Horton, "Noise-Modulated . . . Systems", pp. 821-828, Proc. of IRR, vol. 47, 5/59.

Primary Examiner—Nelson Moskowitz
Attorney, Agent, or Firm—D. A. Newell; E. J. Keeling; H. D. Messner

[57] ABSTRACT

The disclosed invention is a method of seismic exploration using vibratory sources activated by stationary, Gaussian codes. The method has the channel-capacity economy of sign-bit recording, at both the sources and receivers, without the sacrifice of any desired seismic information in the final processed records. Even the relative amplitudes between traces may be recovered in the method.

16 Claims, 6 Drawing Figures

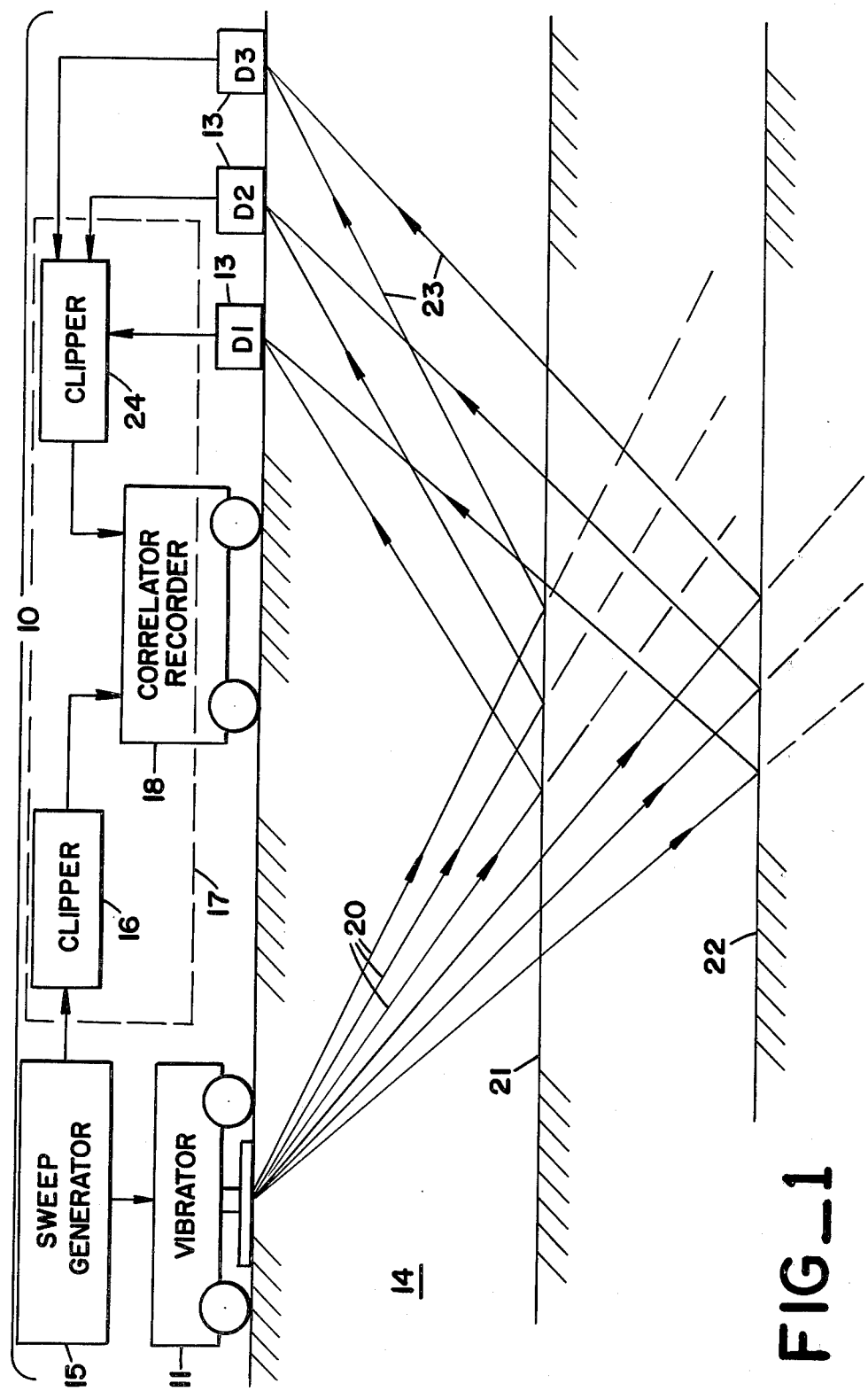
FIG_1

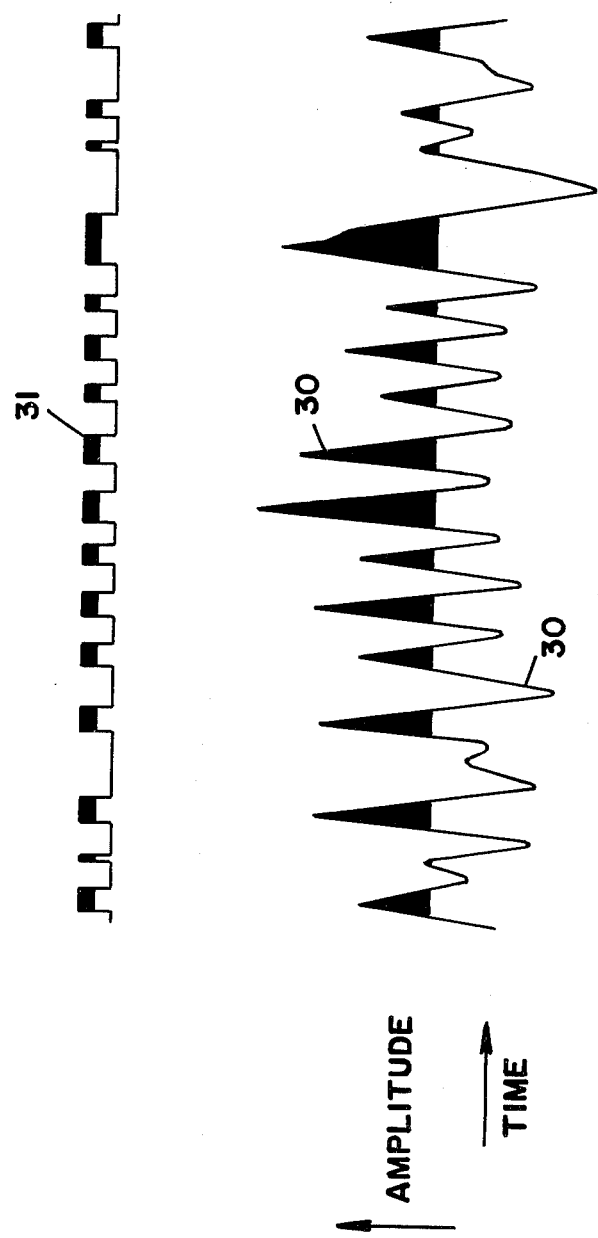

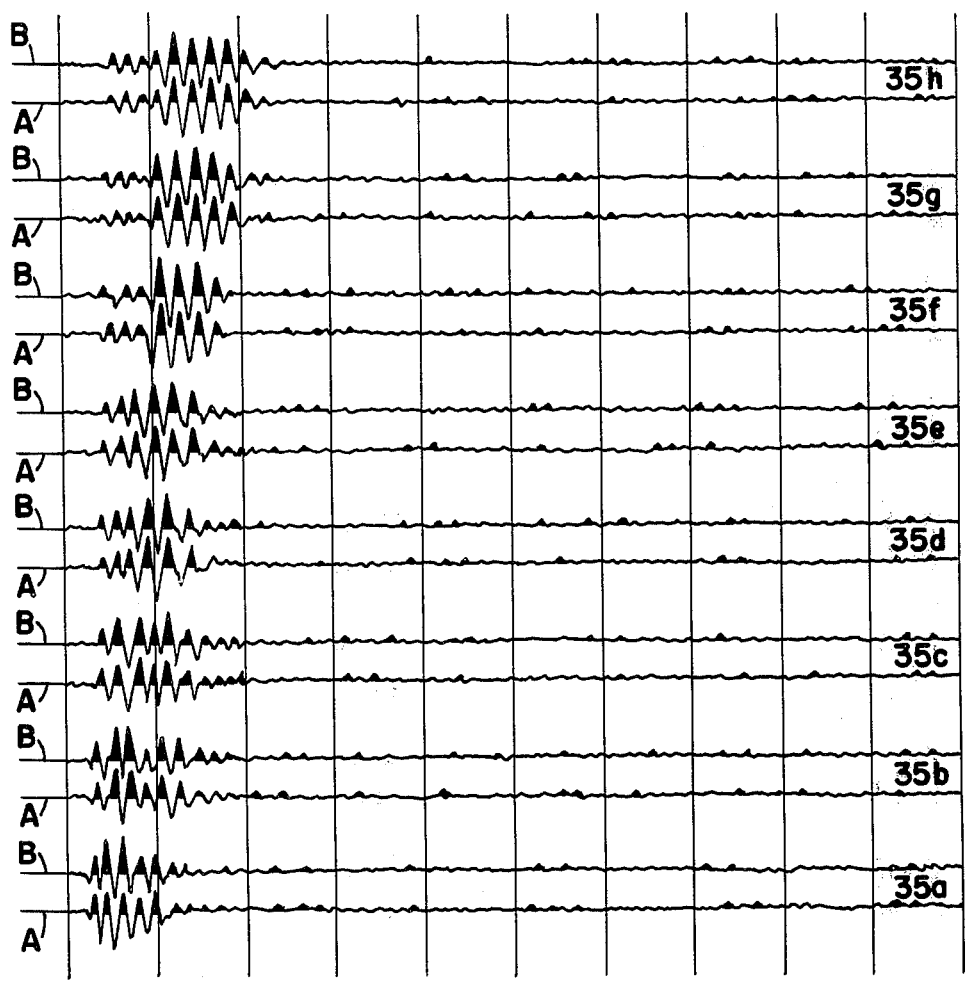
FIG_3

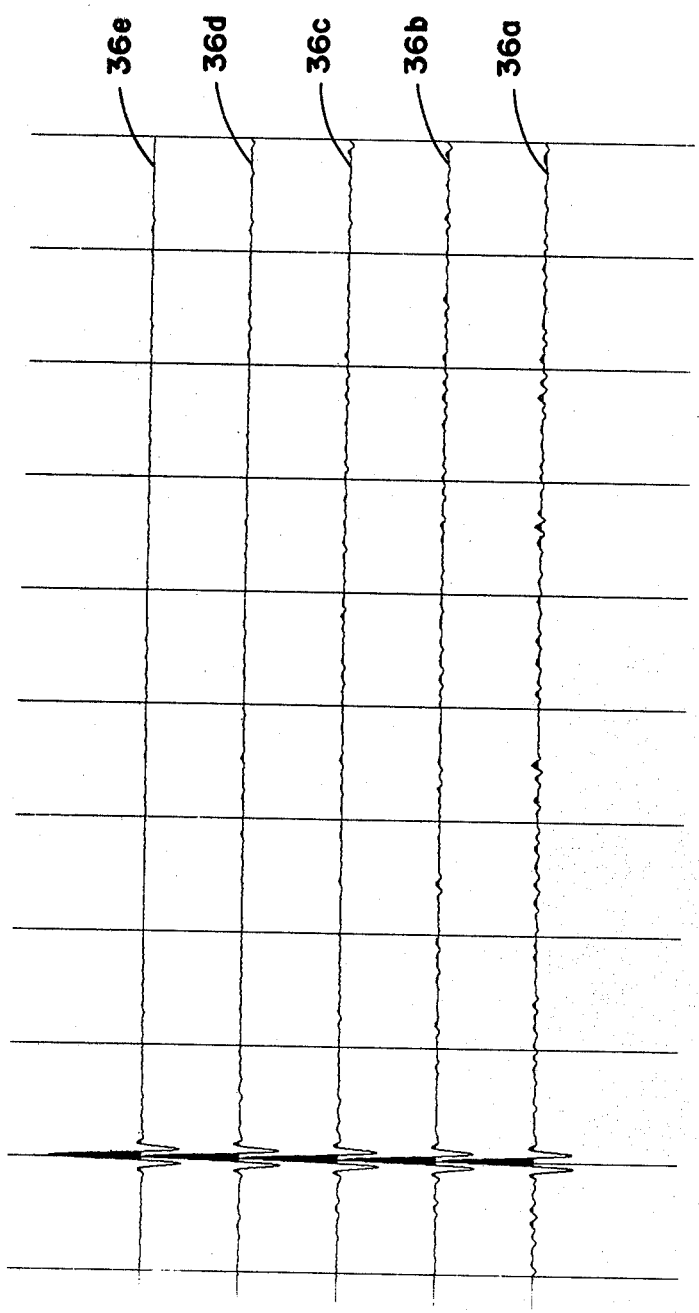
FIG_4

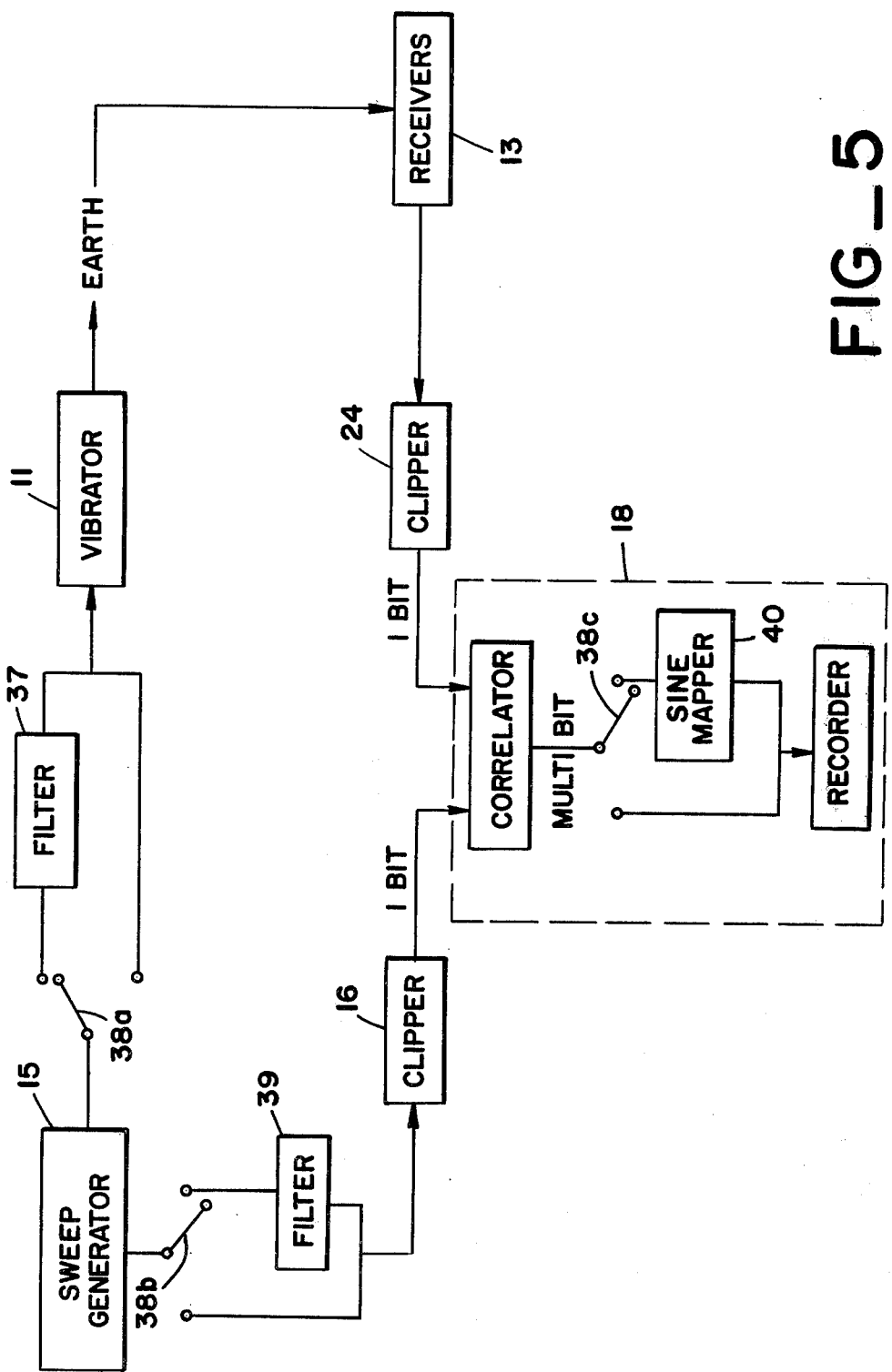
FIG_5

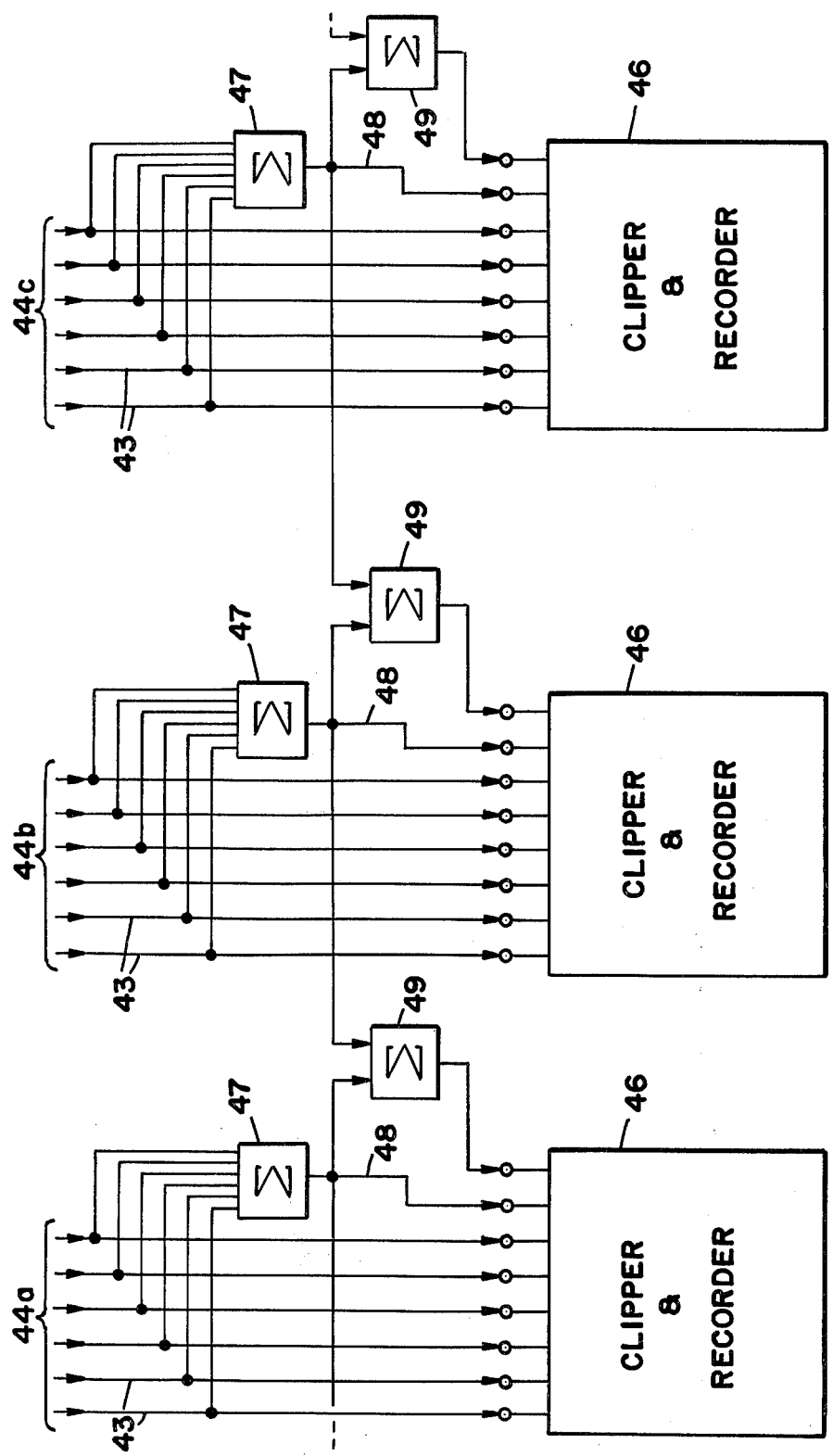
FIG_6

SEISMIC EXPLORATION USING VIBRATORY SOURCES, SIGN-BIT RECORDING, AND PROCESSING THAT MAXIMIZES THE OBTAINED SUBSURFACE INFORMATION

FIELD OF THE INVENTION

This invention relates to seismic exploration in which seismic vibrations, generated by one or more vibratory sources are injected into the earth, and subsequent vibrations are recorded by one or more detectors at a location displaced from the source. More particularly, the invention relates to recovery of all usually-desired seismic wave amplitude information even though representations of the waves injected into the earth, and representations of the subsequent vibrations of the earth are recorded in "sign-bit" or clipped form (i.e., retaining only the algebraic sign of the sinusoidal signals).

BACKGROUND OF THE INVENTION

In the vibratory method of Doty et al., U.S. Pat. No. 2,688,124 Aug. 31, 1954 "Method and Apparatus for Determining Travel Time of Signals", seismic waves are generated by mechanical vibrators on the earth's surface. The waves propagate through the earth in various directions from the vibratory source. Some of the wave energy propagates on downward indefinitely and serves no useful exploration purpose, but at least part of the wave energy is scattered back toward the earth's surface by various reflecting, diffracting, and refracting subsurface formations. That part, when suitably recorded and processed serves to delineate the subsurface formations that scattered it back toward the earth's surface.

In the vibratory method, the waves sent into the earth consist of long wave trains rather than the much sharper wave pulses sent into the earth by the explosive sources used before the Doty et al. invention. An essential part of the Doty et al. invention was to process the received data to produce records that tended to show short pulses representing reflections from subsurface interfaces. The patentees produced the desired shorter pulses on their ultimate seismic records by cross-correlating a recorded representation of the vibratory waves sent into the ground with the recorded representation of the waves received subsequently.

The use of cross-correlation as taught by Doty et al. and many others since, has now become so well known in vibratory seismology that it will be presumed to be well known in the following parts of the present specification; and the description will concern itself only with differences from the prior art.

Martin et al., U.S. Pat. No. 4,058,791 issued Nov. 15, 1977 "Method and Apparatus for Processing Seismic Signals from low Energy Sources" is directed to an effort to solve the growing problem of handling all the information collected in a modern seismic survey. It is now desired to collect information from hundreds, and sometimes even thousands, of receivers, feeding into tens, and sometimes even hundreds, of recording channels. Martin et al. recognize that some essence of the seismic information is preserved if only the algebraic signs of the incoming signals, and not the full wave forms are recorded. Using information channels that need to handle only sign-bits makes it possible to use several times as many channels for the same recording and processing capacity.

Also, Martin et al. observed that in some of their vibratory seismic work, that when sign-bit representations of the source waves were cross-correlated with sign-bit representations of the received waves, the resulting cross-correlation functions appear to be similar to cross-correlation functions from full waveform inputs, provided that the resulting correlation functions are "common depth point stacked" to a high multiplicity ("the CDP fold is at least 40"). However, it is to be particularly noted that Martin et al. use a conventional "chirp" source signal to generate vibrations. Furthermore, Martin et al. indicate that where their stacked final records appeared similar to conventional stacked records using 16-bit recording, they were referring to work of their predecessors, such as Fort et al., U.S. Pat. No. 3,883,725, issued May 13, 1975, "Data Compositing and Array Control System", who added certain "shifting functions" to the received signals before the received signals were clipped. The requirement for high order stacking is objectionable because the large number of information channels required to produce a single stacked output trace tends to cancel out the very advantage for which sign-bit recording is used, its channel-capacity economy. A large number of low capacity channels can require just as much recording and processing capacity as a small number of high capacity channels. Addition of the "shifting functions" is objectionable. It does not improve records in the general case, even though it may have some value in certain limited circumstances (e.g., with low signal-to-noise-ratio signals). So the similarities noted by Martin et al. between the cross-correlation function from their sign-bit recordings and cross-correlations from full waveform recordings depended on special circumstances not desirable to produce, or to encounter, in general seismic exploration work.

There is a further disadvantage of the Martin et al. technique; they had no measure of the similarity they noticed. The results could not be stated in mathematical terms which would indicate how much information had been discarded in the clipping operation (the conversion to sign-bits) and whether or not the discarded information was essential.

Another relevant patent is that of Crook et al., U.S. Pat. No. 3,264,606, Aug. 2, 1966 "Method and Apparatus for Continuous Wave Seismic Prospecting" which teaches driving of vibratory sources (in conjunction with conventional full-wave recording equipment) with pseudo-random codes which, although differing in detail from the preferred codes prescribed here, does share the desirable generic property of "a code sequence which may be represented as a reference time series having a unique auto-correlation function comprising a single major lobe having no side lobes of greater amplitude than the side lobes of the auto-correlation function of statistically unrelated noise components of the composite signal detected at said detecting location" (Column 13, lines 32–44). Aside from the prior art patents, the most relevant technical reference may be the paper of A. B. Cunningham, Geophysics, December 1979, Vol. 44, No. 12, pages 1901 et seq. The Cunningham paper entitled "Some Alternate Vibrator Signals" worked out in mathematical detail the expected types of cross-correlation functions from various types of vibrator sweeps, including certain types of pseudo-random sweeps.

SUMMARY OF THE INVENTION

The present invention does not depend upon high order stacking or the use of extraneous imposed signals. Instead, the present invention uses a class of vibrator signals best characterized as Gaussian, zero mean, and stationary, in conjunction with sign-bit recording, i.e., both the injected and received vibrations originating at the sources and receivers respectively, are recorded in clipped form (i.e., retaining only the algebraic sign). The method of the invention makes maximal use of the information channel-capacity economy of the sign-bit method. Subsequent cross-correlation of the sign-bit representation of the pseudo-random vibrations with the sign-bit representation of the received vibrations, provides cross-correlation records that do not just appear to be similar to cross-correlation records that could have been produced by full-waveform recording; they are actually provably identical, in expectation, to those cross-correlation records, except for an unknown scale factor. So, when the method of the present invention is properly carried out, the only sacrifice that is made by using sign-bit channel-capacity economy is the loss of the knowledge of the absolute scale of each trace. This loss is of no significance in most current seismic exploration.

In accordance with a further aspect of the present invention, relative amplitudes between traces ("trace-to-trace gain") may be determined, e.g., when directional wave components need to be relatively evaluated in order to deduce wave travel directions, or when changes in reflectivity are to be evaluated as functions of offset. In this form of this invention, a small fraction of the available channel-capacity is used to record, also in clipped form, sum traces of the signals on the other channels. These sum traces can be processed to recover all of the relative amplitudes between the traces ("trace-to-trace gains").

These and other features and advantages of the present invention will become evident to exploration seismologists in the light of the following specification, including the appended drawings briefly described here.

BRIEF DESCRIPTION OF THE DRAWINGS

FIG. 1 is a side elevation of an earth formation, and shows major pieces of apparatus used in a survey system for carrying out the present invention, the survey system including a vibratory source adapted to be driven by a pseudo-random code, a series of detectors arranged to receive the propagated portions of the injected vibrations, and processing and recording means for the generated and recorded signals;

FIG. 2 illustrates both a full wave version of a recorded signal and a clipped, or sign-bit version, of that same signal generated by the system of FIG. 1;

FIG. 3 shows processed reflection data from an actual field test of the survey system of FIG. 1, operating in accordance with the present invention;

FIG. 4 shows a sequence of auto-correlations, first that of one random sweep, then a sum of the auto-correlations of two different random sweeps, then a sum of the auto-correlations of 4, then 8, then 16 different random sweeps;

FIG. 5 is a schematic diagram in block form of the system of FIG. 1 showing alternate paths along which signal information may flow, in accordance with the present invention; and FIG. 6 represents optional, additional circuitry by which relative trace amplitudes can be recovered using the processing and recording means of FIG. 1.

DETAILED DESCRIPTION OF THE INVENTION

Refer now to FIG. 1; 10 illustrates the survey system of the present invention. System 10 includes vibratory source 11 positioned at a location distant from a series of detectors 13. In operation, vibratory source 11 injects seismic vibrations into earth formation 14, vibrations whose amplitude-versus-time behavior is controlled by sweep generator 15. The sweep control signals that are fed to vibratory source 11 are also fed through a separate information channel going to clipper 16 of processing and recording unit 17. The purpose of the clipper 16 is to convert the drive signal code into sign-bits. An illustration of such clipping is shown in FIG. 2. The sign-bit representations are then transmitted to correlator and recorder unit 18.

In FIG. 1 the vibratory waves going into earth formation 14 are represented by ray paths 20, the waves traveling obliquely downward toward a pair of stratal interfaces 21, 22 where they undergo partial reflection and travel back upwards along paths 23, again obliquely, toward the series of detectors 13 at earth's surface 12. While only three symbolic detectors are shown in FIG. 1, in actual current field practice, hundreds of detectors may be employed. From detectors 13, the final operations represented in FIG. 1 are transmissions of data through another clipper 24 to the correlator and recorder unit 18 of the processing and recording circuit 17. In the correlator and recorder unit 18, cross-correlations are made of the clipped, received data and the clipped representations of the injected vibratory sweeps.

Reference is now made to FIG. 2, which illustrates both a full waveform 30 and its clipped version 31 as provided by clipper 24 of FIG. 1. All of the wave loops in the clipped version have been cut off just above or just below the horizontal axis, so that only the sign-bits are retained. Obviously, some of the information contained in the original wave has been discarded in the clipping operation. But how much? More particularly, is the information that was discarded necessary information for seismic interpretation purposes? Exploration seismologists have not had quantitative answers to these questions.

There has been a qualitative answer that at least partially satisfied those exploration seismologists who have been developing and using sign-bit recording because of its highly desirable information channel-capacity economy. As has already been mentioned, when clipped waveforms of vibrator and detector are cross-correlated and stacked with a high multiplicity, the stacked cross-correlations appear similar to the stacked cross-correlations made with full waveforms. But the mere appearance of similarity has not convinced seismologists in general that all the desirable information is still there after clipping.

An essence of the present invention is the discovery that if certain types of sweep functions are used to drive the vibratory sources, the answers to the above questions become known. It becomes possible to state quantitatively what part of the original information has been lost by clipping. It becomes possible moreover to state that for most currently practiced seismic exploration—if those specified types of driving functions are used—none of the usually-used seismic information will be sacrificed in the clipping operation.

The physical steps of the present invention, when properly combined, make possible the utilization of the theoretically-provable, maximum amount of information that can be recovered from correlated clipped wave forms.

That is should be possible to recover all information except the absolute amplitude from correlations of clipped-wave-form representations of stationary Gaussian functions was implied in theoretical results obtained by Van Vleck in a 1943 report dealing with radar jamming signals ("The Spectrum of Clipped Noise" Report No. 51, Radio Research Laboratory of Harvard University, July 21, 1943). That wartime report was not widely circulated, even among those in the radio arts. People who remembered the report and believed that it contained valuable theoretical results revived the material and republished it under the auspices of the Institute of Electrical and Electronics Engineers ("The Spectrum of Clipped Noise", Van Vleck and Middleton, IEEE Proceedings v. 54, No. 1, Jan. 1966, pp. 2-19). The second paper, like the first, was still explicitly concerned with noise for the purpose of radar jamming, and to my knowledge, has remained relatively unknown among exploration geophysicists. Among present-day exploration geophysicists, there are a few people who were previously engaged in World War II radar work, but if any of them have known about, and understood, the Van Vleck paper, they have apparently not thought of its geophysical implications. An unobvious twist of thought was necessary to bring out those implications. It was necessary to think of Van Vleck's "noise", the purposeful jamming "disturbance" with which he was dealing, as a possible seismic "signal", just the opposite from what would then be called the "noise" in the seismic context.

The result of Van Vleck that bears upon the present invention is his Equation (17) on page 11 of the 1966 paper. It is given here in notation different from that of Van Vleck, notation more like that used in current theoretical seismology.

Van Vleck's result can be stated as follows:
Let

W, Y, be stationary jointly-gaussian zero mean random processes;

k(.) be the clipping function which is characteristic of sign-bit recording;

and X (.,.) be the normalized cross-correlation function. By "normalized", I mean it is scaled down by the product of the RMS levels of Y and W. (This scaling means that such functions contain no information about absolute amplitude).

Then $$X(W,Y) = \sin\left(\frac{\pi}{2} X(k(W), k(Y))\right) \quad (1)$$

In words, equation (1) states that given two input signals (W and Y) with the right properties, their cross-correlation X(W,Y) is the same (except for the mapping implied by the Sine function) as a scaled cross-correlation of the clipped version of the two input signals, k(W) and k(Y).

To see how this result applies to seismic prospecting, suppose that W is a vibrator sweep and Y is the uncorrelated data recorded at a particular geophone. In that case X(W,Y) represents the correlated output of a standard true amplitude recording system (i.e., no clipping anywhere in the system, and X(k(W), k(Y)) represents the normalized correlated output of a system in which the data is clipped as it comes in at the geophone and then is correlated with a clipped sweep (i.e., a sign-bit recording system). Interpreted in this fashion, Van Vleck's result implies that if the sweep and the recorded data have the right properties, data can be recorded with sign-bit systems with no distortion except loss of absolute trace amplitude information. Absolute trace amplitude is lost because Van Vleck's result applies to normalized cross-correlations. The amplitude loss is the same as that which occurs when data are trace equalized using a single gate containing the whole trace. It is not equivalent to an AGC operation.

OPERATIONAL STEPS OF THE INVENTION

With the above as a guide, briefly, the operational steps of method of the present invention may now be specified using vibratory sweeps and sign-bit recording which will produce final cross-correlation traces that are closely equivalent, within mathematical expectation, to cross-correlation traces that could have been made with full wave recording, lacking only their overall absolute values, quantities that are rarely, if ever, used in present day exploration seismology. In accordance with method aspects, a preferred embodiment of the present invention includes the steps of:

A. Injecting seismic vibrations into the earth by driving at least one substantially linearly-responding vibratory source with a pseudo-random code that is Gaussian, zero mean, and stationary, B. Recording the pseudo-random code in clipped form, i.e., retaining only the sign-bits, C. Recording in clipped form the seismic vibrations that have propagated through the earth from the vibratory source(s) to the receiver(s), and D. Cross-correlating the sign-bit representation of the pseudo-random code with the sign-bit representation(s) of the received seismic vibrations.

The result of such cross-correlation, without more, is the seismic record.

The above four steps, performed in combination, give the result never achieved before, the final cross-correlation traces that are equivalent within mathematical expectation to cross-correlation traces that could have been made with full wave recording, except for their overall absolute values. Within the combination of the above steps, the particular step that differs most from its prior art counterparts is the first one, Step A. It is appropriate therefore to go into some detail concerning the pseudo-random codes used to drive the linearly-responding vibratory source 11 of the system shown in FIG. 1.

In the art of driving vibratory sources, extensive use has already been made of activating codes embodied on magnetic tape, so it is unnecessary to discuss here how the activating codes are used to drive the vibrators. It should be commented, however, that the art has now progressed to the point where it is no longer necessary to generate activating codes at a remote computer center and transport them on magnetic tape to a field location. Codes can now be generated "in real time" at field sites using microprocessors, and it seems possible that in the future this will become the preferred way to generate them.

The discussion here will concern itself with some of the possible options in preparing a code particularly suited for the practice of this invention; a code that is a realization of a Gaussian, zero mean, stationary code. To begin, one may first consider the length of time that the sweep will be expected to continue. For discussion purposes, 32 seconds is a possible time interval. The magnetic tape devices used in geophysical prospecting have various sampling intervals. Two milliseconds is a possible choice. Thirty-two seconds of code at a two-millisecond sampling rate require 16000 random numbers. These may be generated in several ways. One way is to use, in succession, two of the well-known subroutines in the IBM Scientific Subroutine Package: RANDU, to generate a set of uniformly-random numbers, then GAUSS, to convert those numbers into a set with Gaussian distribution. Other ways of generating suitable sets of numbers have been discussed by Lewis in the IBM Systems Journal No. 2 (1969) and by Knuth in his book "Seminumerical Algorithms" (Vol. 2 of the "Art of Computer Programming", Addison Wesley Pub. Co.). However it is done, the desired objective for purposes of this invention is a set of random numbers with a zero mean, and a Gaussian distribution.

A set of random numbers, 500 per second, may contain, in frequency terms, components up to 250 Hertz, and such frequencies are higher than those usually considered useful in current field vibrator work. So a possible next step is to put the set of random numbers through a digital band-pass filter to restrict the frequency content to a band, say, between 10 and 80 Hz. Many phase characteristics are possible. Minimum phase is preferred, but zero phase may be satisfactory.

The last condition that the pseudo-random code should satisfy in order that the entire method of the present invention will correspond as nearly as practicable to the ideal conditions indicated by Van Vleck's result, is the condition of "stationarity". Statistical stationarity, by definition, is the maintenance of the same statistical characteristics throughout the time interval of interest. A pseudo-random code generated as described above has inherent stationarity as long as program control parameters are not varied during the time it is activating the vibrator(s). Stationarity of both the source and receiver data is approached as closely as practicable by (1) beginning the actuation of the vibrator(s) long enough before the starting of the recording for transients associated with the impulse response of the earth to die down substantially (e.g., 6 seconds) and (2) continuing the actuation of the vibrators, such as 11, throughout the time interval in which the vibrations that have propagated through the earth are being recorded by the receivers, such as 13.

It was stated above, without the benefit of any supporting discussion, that the vibratory source(s) should be "substantially linearly-responding". This condition for properly carrying out the present invention may require a change from some of the present field practice with vibratory sources. Most conventional vibrators are equipped with automatic feedback mechanisms (e.g., phase-lock-loops) which are usually known as phase compensators. These devices are designed under the assumption that the signal driving the vibrator had a frequency content which is slowly varying in time. Random sweeps clearly do not fit this assumption. Experience has shown that some phase compensators significantly distort the vibrator output when random sweeps are used as input. For example, in one field experiment, a vibrator actually turned itself off and there was no response to a random input. Removal of the phase compensators is required to make some vibrators behave in a substantially linear manner when driven with random sweeps. However, when phase compensators are removed, automatic compensation for mechanical differences between different vibrators no longer occurs, and some form of explicit vibrator calibration may be advisable.

FIG. 3 shows processed reflection data from an actual field test of the method of the invention. In FIG. 3 correlated reflection data from 8 geophone groups are designated 35$a$, 35$b$, 35$c$, 35$d$, 35$e$, 35$f$, 35$g$ and 35$h$. The group 35$a$ was nearest the shot. It had an offset of 120 ft. The spacing between groups was 30 ft. Each group consisted of 6 geophones spaced 5 feet apart along the direction of the profile. The random sweep used to generate these data was 16 seconds long and had a sample rate of 2 milliseconds. The sweep was generated by passing a random number sequence generated with RANDU and GAUSS through a zero phase filter. The filter's amplitude response increased linearly from 0 Hz to 125 Hz at a rate of 12 db/octave. Above 125 Hz the filter amplitude response decreased linearly at a rate of 72 db/octave.

Two traces are A and B shown for each geophone group. Trace A results from correlation of a full amplitude representation of both the random sweep and the signal received at the geophones. Trace B for each group is the result of correlation of sign-bit representations of both the random sweep and the receiver signal. The vertical lines through the traces are timing lines at 100 millisecond intervals. The similarity of the two traces A and B from each group is obvious. The slight differences between the traces can be attributed to the fact that Van Vleck's result applies to expectations rather than specific realizations, and to the fact that the sweep parameters and the recording equipment used to acquire these data were not optimum for use in the method of this invention.

The data of FIG. 3 provide strong evidence that the present method, although it has the channel-capacity economy of sign-bit recording at both the sources and receivers, does not sacrifice any of the usually desired seismic information in the final processed records.

From this point on, the discussion will be concerned with refinements and variations not necessary to make the basic method operable, but may be desirable for optimum performance.

Sometimes in vibrator seismology, in order to increase the effective signal-to-noise ratio, it is desirable to make repetitive sweeps and add the records from the successive repetitions expecting that desired signals will be reinforced and the noise will tend to cancel itself out. When random sweeps are being used, and such repetitions are made, it is desirable to use a different time sequence of random vibrations for each repetition. FIG. 4 illustrates this, using auto-correlated random sweeps recorded as traces 36$a$, 36$b$, 36$c$, 36$d$, and 36$e$. Trace 36$a$ is the auto-correlation from a single sweep. The other traces 36$b$, 36$c$ . . . 36$e$ are the sums of the auto-correlations of successively 2, 4, 8, and 16 different sweeps. (The vertical lines are 100 millisecond timing lines.) The events seen in addition to the main peak are due to correlation noise. Since the correlation noise of any one sweep is different from that of any other sweep, the level of this noise decreases as more sweeps are summed.

Another refinement of the method is the addition of a mapping step corresponding to the full expression of Van Vleck's result. This consists in adding another step to basic method, viz., transforming the amplitudes of the cross-correlation functions in accordance with the relationship:

$$X(W,Y) = \sin^{90}{}_2 X(k(W), k(Y)) \qquad (1)$$

where:

k(W) is the clipped, recorded function representing the injected vibrations, k(Y) is the clipped, recorded function representing the received reflected vibrations, X(k(W),k(Y)) is the cross-correlation function of k(W) and k(Y), X(W,Y) is the normalized cross-correlation function of the full amplitude version of the two functions W and Y (neither one being clipped).

This step will, in statistical expectation, bring the wave forms of the final cross-correlations into their closest possible similarity to the forms that would have been obtained using full wave recording.

Some of the variations and alternatives in the method of the present invention are illustrated in FIG. 5. Alternate data paths are shown along which signal information may flow during practice of the method. The original pseudo-random code from the sweep generator 15 may flow through filter 37 on its way to the vibrator 11, or it may not, depending on the state of switch 38a. The code may flow through filter 39 on its way to the clipper 16 and subsequently to the correlator and recorder unit 18, or it may not, depending on the state of switch 38b. Within unit 18, the multi-bit correlation functions may go directly to form the final record or they may go through a sine-mapper 40 depending on the state of switch 38c.

AN EMBODIMENT OF THE INVENTION THAT RECOVERS RELATIVE AMPLITUDES

It has been mentioned already, that in currently practiced exploration seismology there is seldom a need to know the absolute amplitudes of the recorded vibrations. (In this respect, exploration seismology of course differs from earthquake seismology, in which determination of absolute amplitudes is a primary objective.) As also mentioned above, however, in exploration seismology there is indeed sometimes a need to know the relative amplitudes among seismic traces, e.g., when three-component geophones are being used in order to determine the direction of wave travel. Relative amplitudes need to be known also when changes in reflectivity are to be evaluated as functions of offset. In such cases there is an extension of the method of the present invention that enables relative amplitudes between traces to be determined.

In the following description it will be understood that the traces whose relative amplitudes are desired to be known are the final, cross-correlation traces. In accordance with previous teachings in this specification it is known, through my unique application of Van Vleck's result, that those cross-correlation traces are accurate representations of the original seismic information except for the loss of a scaling factor. All the correlation traces have been "normalized" and are missing an unknown over-all multiplier.

A small modification of circuitry within processing and recording unit 17 of FIG. 1, permits the recovery of additional information that enables the desired relative amplitudes to be recovered.

Reference is now made to FIG. 6. In FIG. 6, signal channels 43 from a plurality of detector groups (or possibly in some field experiments, from individual detectors) are shown. Channels 43 are divided into subsets 44a, 44b, 44c, each of which, as seen in FIG. 6, consists of six of said channels per subset, although they could consist of as few as two channels, or as many as a thousand, conceptually. Before each subset of channels 43 is fed into a series of clipper and recorder units 46, signals of such a subset are summed at a summer 47 and fed via an auxiliary channel 48 to clipper and recorder unit 46. The sum signal in each auxiliary channel is clipped and recorded alongside the signals from the channels in each subset. So, in the later cross-correlations there will be, for each subset of six traces with six unknown multipliers, a seventh trace, also with an unknown multiplier.

Now, if attention is fixed on any particular point in time along the above-indicated seven correlations, it will be appreciated that one can obtain six multibit amplitude values from the subset traces and one multibit value from the auxiliary trace that is the sum of the multibit values from the subset traces. Proceeding then, one by one, to five more, different points in time, one can obtain, for each point in time, six more multibit values from the subset traces and one more multibit value from the auxiliary trace. It will be appreciated by those skilled in exploration seismology that from just these six points in time, one can form a set of six simultaneous equations to solve for the ratios of all the unknown subset trace multipliers to the unknown auxiliary trace multiplier, and that this is tantamount to solving for the relative amplitudes between the subset traces.

Under actual exploration conditions when all the traces are burdened with noise, it is better practice to use more time points than there are subset traces to obtain redundant sets of equations, many more equations than unknowns, and to solve the redundant sets, e.g., by least squares methods, to obtain statistically confident values of the unknown multipliers. (Methods of solving redundant sets of linear equations are discussed by many authors, e.g., G. P. Barnard: "Modern Mass Spectrometry", The Institute of Physics (London) 1953, pp. 214–230).

It will be appreciated that the prescription immediately above for solving for the relative amplitudes in a subset of traces falls short of telling how to handle a multiplicity of such subsets so that all the relative amplitudes between all the traces become known. To make this final step a second auxiliary channel of data needs to have been recorded. Reference is made again to FIG. 6, which shows additional summers 49 between the subsets 44a, 44b, 44c, which sum the sums of the adjacent subsets. By an obvious extension of the reasoning already given, it can be seen that the relative amplitudes of all the subset sums can be determined from the sums of the sums. It then becomes apparent that all the relative amplitudes between all the traces in any given number of traces can be determined by this scheme of summing subsets and summing the sums of the subsets.

It is now apparent that a method of seismic exploration has been described that has the channel-capacity economy of sign-bit recording, at both the sources and receivers, without the sacrifice of any of the usually desired seismic information in the final processed records. Even the relative amplitudes between traces can be recovered, if desired. The phrase "channel-capacity economy" is used in several places in this specification. To those skilled in the art, this phrase implies more than the mere numerical factor of 16 that is explicit in the contracting designations, "16-bit recording" and "sign-bit recording". From information theory it is known that when fewer bits per second need to be transmitted over any information channel, other advantages ensue, some of which may be traded off against each other.

A lower bit-per-second requirement makes it possible to reduce either the usable bandwidth of an information channel, or if it is more advantageous, the effective signal-to-noise ratio.

The invention is not limited to the specific embodiments described above, because variations will be readily apparent to those skilled in the art. Thus, the invention is to be given the broadest possible interpretation within the terms of the following claims.

I claim:

1. A method of seismic surveying using vibratory sources that recovers all the essential information of full-waveform recording even though said method uses only sign-bit recording of both the source signals and the detected signals, which comprises:
   A. injecting seismic vibrations into the earth by driving at least one substantially linearly-responding vibratory source with a substantially Gaussian, zero mean, stationary code;
   B. recording a sign-bit representation of said substantially Gaussian, zero mean, stationary code;
   C. recording a sign-bit representation of the seismic vibrations that have propagated through the earth from said at least one vibratory source to at least one receiver; and
   D. cross-correlating said sign-bit representation of said substantially Gaussian, zero mean, stationary code with said sign-bit representation of the received said seismic vibrations; the result of said cross-correlating being the desired seismic survey record.

2. The method of claim 1, in which the injecting of said seismic vibrations is continued throughout the time interval in which said propagated seismic vibrations are received.

3. The method of claim 1, with an additional step: transforming the amplitudes of the cross-correlation product resulting from Step D in accordance with the relationship:

$$X[W,Y] = \sin\left(\frac{\pi}{2} X [k(W),k(Y)]\right)$$

where:
   k(W) is the sign-bit recorded function representing the injected vibrations,
   k(Y) is the sign-bit recorded function representing the received propagated vibrations,
   X[k(W),k(Y)] is the cross-correlation function of k(W) and k(Y), and
   X[W,Y] is the normalized cross-correlation function of the full amplitude version of the two functions W and Y.

4. The method of claim 1, in which when Steps A to D are repeated, a different time sequence of substantially Gaussian, zero mean, stationary seismic vibrations is used for each time said steps are repeated.

5. The method of claim 1, in which said substantially Gaussian, zero mean, stationary code is filtered, before said code is used to drive said vibratory source, through a filter selected from the class consisting of minimum-phase band-pass filters and zero-phase band-pass filters.

6. The method of claim 1, in which said substantially Gaussian, zero mean, stationary code is filtered, before said code is used to drive said vibratory source and also before said code is recoded in sign-bit form, through a filter selected from the class consisting of minimum-phase band-pass filters and zero-phase band-pass filters.

7. The method of claim 1, in which a multiplicity of seismic receivers is used, and a corresponding multiplicity of signal channels leads toward a recorder, with the following adjuncts to Step C:
   i. dividing said multiplicity of signal channels into subsets, each subset consisting of at least two of said channels; and
   ii. by using at least one auxiliary channel for each subset, recording in sign-bit form the sum of the signals within each subset.

8. The method of claim 1, in which a multiplicity of seismic receivers is used, and a corresponding multiplicity of signal channels leads toward a recorder, with the following adjuncts to Step C:
   i. dividing said multiplicity of signal channels into subsets, each subset consisting of at least two of said channels;
   ii. by using at least one auxiliary channel for each subset, recording in sign-bit form the sum of the signals within each subset; and
   iii. by using at least one other auxiliary channel for each subset, recording in sign-bit form the compound sum comprising the sum of the signals within the subset itself and the sum of the signals from an adjacent subset.

9. The method of claim 1, in which a multiplicity of seismic receivers is used, and a corresponding multiplicity of signal channels leads toward a recorder, with the following adjuncts to Step C:
   i. dividing said multiplicity of signal channels into subsets, each subset consisting of at least two of said channels;
   ii. by using at least one auxiliary channel for each subset, recording in sign-bit form the sum of the signals within each subset; and
   iii. by using at least one other auxiliary channel for each subset, recording in sign-bit form the compound sum comprising the sum of the signals within the subset itself and the sum of the signals from another subset in such a manner that the sum of the traces in each subset contributes to at least two said compound sums.

10. A method of seismic surveying using vibratory sources, said method having the channel capacity economy of clipped recording of the injected and received seismic waves without sacrifice of essential seismic information in the seismic record which comprises:
   A. generating a pseudo-random code which is Gaussian, zero mean, and stationary;
   B. filtering said code through a filter selected from the class consisting of minimum-phase band-pass and zero-phase band-pass;
   C. driving at least one substantially linearly-responding seismic vibratory source with the resultant filtered code to inject seismic signals into the earth for a time interval longer than the recording interval of the resultant seismic waves;

D. recording a clipped representation of the seismic signals detected by at least one receiver positioned to detect said resultant seismic waves;

E. recording a clipped representation of said pseudo-random code without filtering thereof; and F. cross-correlating said clipped representation of said pseudo-random code with said clipped representation of said detected seismic signals; the result of said cross-correlating being the desired seismic record.

11. The method of claim 10, in which Steps A to F are repeated, and a different time sequence of random seismic vibrations is used for each time said steps are repeated.

12. The method of claim 10 in which a multiplicity of seismic receivers is used, and a corresponding multiplicity of signal channels leads toward a recorder, with the following adjunct to D:

i. dividing said multiplicity of signal channels into subsets, each subset consisting of at least two of said channels; and ii. by using at least one auxiliary channel for each subset, recording in clipped form the sum of the signals within each subset.

13. A method of seismic surveying using at least one vibratory source that recovers all essential information of full-waveform recording even though said method uses only clipped recording of both the source signals and the detected signals, which comprises:

A. injecting seismic vibrations into the earth by driving at least one substantially linearly-responding vibratory source with a substantially Gaussian, zero mean, stationary code;

B. recording a clipped representation of said substantially Gaussian, zero mean, stationary code;

C. recording a clipped representation of the seismic vibrations that have propagated through the earth from said at least one vibratory source to at least one receiver; and D. cross-correlating said clipped representation of said substantially Gaussian, zero mean, stationary code with said clipped representation of the recording of said propagated seismic vibrations by said receiver;

the result of said cross-correlating being the desired seismic survey record.

14. A method of seismic surveying using vibratory sources, said method having the channel capacity economy of sign-bit recording of both source signals and received signals without sacrifice of the essential seismic information that would have been obtained with full-waveform recording of both the source signals and the received signals, which comprises:

A. injecting seismic vibrations into the earth by driving at least one substantially linearly-responding vibratory source with a substantially Gaussian, zero mean, stationary code;

B. recording a sign-bit representation of said substantially Gaussian, zero mean, stationary code;

C. recording a sign-bit representation of the seismic vibrations that have propagated through the eaerth from said at least one vibratory source to at least one receiver; and D. cross-correlating said sign-bit representation of said substantially Gaussian, zero mean, stationary code with said sign-bit representation of the received seismic vibrations; the result of said cross-correlating being the desired seismic survey record.

15. A method of seismic exploration having the channel-capacity economy of sign-bit recording of the received full-waveform sinusoidal seismic signals without sacrifice of essential seismic information in the seismic record which comprises:

A. generating a substantially Gaussian, zero mean, stationary code;

B. driving at least one substantially linearly-responding vibratory source with said substantially Gaussian, zero mean, stationary code to inject seismic vibrations into the earth;

C. recording a sign-bit representation of the seismic vibrations propagated through the earth from said source and detected by at least one receiver;

D. recording a sign-bit representation of said substantially Gaussian, zero mean, stationary code before, during or after said code is used to drive said vibratory source; and E. cross-correlating said sign-bit representation of said received seismic vibrations with said sign-bit representation of said substantially Gaussian, zero mean, stationary code; the result of said cross-correlating being the desired seismic exploration record.

16. A method of seismic surveying using vibratory sources that recovers all essential information of full-waveform recording even though said method records only sign-bit recording representations of both the source input signals and detected receiver signals, which comprises:

A. injecting a substantially Gaussian, zero mean, stationary seismic signal into the earth by driving a substantially linearly-responding vibratory source against said earth;

B. recording a sign-bit representation of said injected substantially Gaussian, zero mean, stationary signal;

C. after said substantially Gaussian, zero mean, stationary signal has propagated through the earth from said at least one vibratory source to at least one receiver, recording a sign-bit representation of the detected receiver signal; and D. cross-correlating said sign-bit representation of said injected substantially Gaussian, zero mean, stationary signal with said sign-bit representation of the detected receiver signal, the result of said cross-correlating being the desired seismic survey record.

* * * * *